United States Patent [19]

Gose et al.

[11] Patent Number: 5,448,174
[45] Date of Patent: Sep. 5, 1995

[54] PROTECTIVE CIRCUIT HAVING ENHANCED THERMAL SHUTDOWN

[75] Inventors: Mark W. Gose; John R. Fruth, both of Kokomo, Ind.

[73] Assignee: Delco Electronics Corp., Kokomo, Ind.

[21] Appl. No.: 296,287

[22] Filed: Aug. 25, 1994

[51] Int. Cl.⁶ .................. H03K 5/153; H03H 11/26
[52] U.S. Cl. ........................... 327/513; 327/83; 327/262; 327/378
[58] Field of Search ............... 327/83, 262, 378, 513

[56] References Cited

U.S. PATENT DOCUMENTS

| | | | |
|---|---|---|---|
| 4,034,241 | 7/1977 | van der Burg et al. | 327/83 |
| 4,401,898 | 8/1983 | Sommerer | 327/513 |
| 4,760,286 | 7/1988 | Pigott | 327/513 |
| 4,945,260 | 7/1990 | Naghshineh et al. | 327/513 |
| 5,077,491 | 12/1991 | Heck et al. | 327/83 |
| 5,359,236 | 10/1994 | Giordano et al. | 327/378 |

Primary Examiner—Margaret Rose Wambach
Attorney, Agent, or Firm—Jimmy L. Funke

[57] ABSTRACT

A protective circuit having enhanced and accurate thermal shutdown temperatures. The protective circuit establishes the thermal shutdown temperature within a predetermined range and provides an output signal when the thermal shutdown temperature is exceeded. The protective circuit, in one embodiment, comprises a current generator for supplying a predetermined collector current $I_{c1}$, a current mirror arrangement for supplying a collector current $I_{c2}$ which has a mirror response to that of the collector current $I_{c1}$, a resistor arranged to have the mirror collector current $I_{c2}$ flowing therethrough, and the combination of a resistor and a bipolar transistor serving as a thermal sensor. The current generator comprises at least a pair of bipolar transistors selected from one of the NPN and PNP types with each of said pair operating with different current densities. The base electrodes of the pair are interconnected by a resistor. The collector current $I_{c1}$ flows through another resistor connected to the emitter electrode of one of said bipolar transistors. The current mirror arrangement has its mirror collector current determined by the value of the resistor at the emitter electrode of the bipolar transistor. The current mirror arrangement comprises bipolar transistors selected to be of the opposite NPN and PNP types as the current generator. The bipolar transistor serving as the thermal sensor is selected to be of the same type NPN and PNP as the current generator and has a known beta ($\beta$) vs. $V_{be}$ relationship. The bipolar transistor is arranged in the output stage of the protective circuit and establishes a quantity $V_{tsd}$ which determines the thermal shutdown temperature. The $V_{tsd}$ quantity tracks the response of the beta ($\beta$) parameter so as to cancel the effects that the variable $V_{be}$ parameter contributes to the thermal shutdown temperature.

3 Claims, 4 Drawing Sheets

PROTECTIVE CIRCUIT HAVING ENHANCED THERMAL SHUTDOWN

TECHNICAL FIELD

The present invention relates to protective circuits. More particularly, the present invention relates to a protective circuit that accurately provides a shutdown condition within a predetermined temperature range. Specifically, the present invention relates to a bipolar transistor serving as a thermal sensor arranged in the protective circuit having a response which is interrelated to the relationship between the $V_{be}$ and beta ($\beta$) parameters of the thermal sensor and that provides for the accurate shutdown temperature in spite of variations in the $V_{be}$ parameter occurring during the fabrication process of the integrated circuit.

BACKGROUND OF THE INVENTION

Protective circuits that prevent circuit elements from entering into a destructive mode of operation that might otherwise irreversibly cause deleterious effects to occur are known. These thermal shutdown circuits commonly use a NPN or PNP transistor as a thermal sensor which has a reference voltage placed across its base and emitter electrodes so as to establish a desired $V_{be}$ (emitter to base voltage) quantity. The circuit arrangement typically provides a reference voltage having a positive temperature coefficient so that it may offset or compensate for the $V_{be}$ characteristic of the thermal sensor which typically has a known negative temperature coefficient. The magnitude of the reference voltage is set so that it equals the $V_{be}$ quantity of the thermal sensor at a certain temperature. Below this temperature the thermal sensor is rendered off and above this temperature the thermal sensor is rendered on. Typically, this is a temperature that keeps the protective circuit out of the destructive mode and it is referred to herein as the thermal shutdown (TSD) temperature. In order for the TSD temperature to be accurately provided, the characteristic $V_{be}$ at that temperature must be predicted with certainty.

In conventional thermal shutdown circuits, the most significant variation in the TSD temperature is created by the uncertainty of the $V_{be}$ quantity of the thermal sensor due to fluctuations occurring in the process of fabricating the integrated circuit. These variations can be as large as 50 millivolts (mV) from its minimum to its maximum value and such a fluctuation translates to a range of about ±12.5° C. variation in the TSD temperature. Furthermore, additional fluctuations are experienced due to small variations in circuit component mismatches, such as resistors and base current parameters.

SUMMARY OF THE INVENTION

It is, therefore, a primary object of the present invention to provide a protective circuit that compensates for variations in the $V_{be}$ characteristic due to process variations occurring in the fabrication of the integrated circuit so that a more accurate and stable TSD temperature may be provided for a protection circuit.

It is another object of the present invention to provide a bipolar transistor serving as a thermal sensor that is arranged in a protective circuit whose response is interrelated to the relationship between the $V_{be}$ parameter and the beta ($\beta$) (current gain of a common-emitter bipolar transistor stage) parameter of the thermal sensor, whereby increases and decreases in the beta ($\beta$) parameter compensates or offsets for increases and decreases in the $V_{be}$ parameter.

It is a further object of the present invention to provide for a protective circuit that yields a TSD temperature within a predetermined range which is considerably less than about ±12.5° C.

Other objects of the present invention, as well as the advantages thereof over existing prior art forms, which will be apparent in view of the following description and are accomplished by means hereinafter described and claimed.

In general, a protective circuit embodying the concepts of the present invention utilizes a bipolar transistor as a thermal sensor having a predetermined beta ($\beta$) vs. $V_{be}$ relationship. The bipolar transistor is arranged in the output stage of the protective circuit and the protective circuit is arranged so that the TSD temperature is accurately provided in spite of variations that may have occurred for the $V_{be}$ parameter of the thermal sensor during its fabrication process.

To appreciate the invention in its operative environment, the operation of the protective circuit is selected so as to be interrelated to the relationship between the $V_{be}$ and beta ($\beta$) parameters of the thermal sensor. The operation incorporating this interrelationship establishes and maintains an accurate TSD temperature within a predetermined range.

In one embodiment, the protective circuit comprises a current generator, a current mirror arrangement, and an arrangement of a resistor R3 and a bipolar transistor. The current generator supplies a predetermined collector current $I_{c1}$ and comprises a pair of bipolar transistors both selected from one of the NPN and PNP types with each of the pair operating with different current densities and with each bipolar transistor having emitter, base, and collector electrodes. The base electrodes of the pair of transistors are interconnected by a resistor R2 and the collector current $I_{c1}$ flows through a resistor R1 connected to the emitter electrode of the bipolar transistor having the lower current density. The current mirror arrangement supplies a collector current $I_{c2}$ which has a mirror response of two times the collector current $I_{c1}$ and is of a value determined by the resistor R1. The current mirror arrangement comprises bipolar transistors selected from the opposite NPN and PNP types as that of the current generator. The resistor R3 is arranged to have the mirror collector current $I_{c2}$ flowing therethrough. The bipolar transistor primarily serving as a thermal sensor is of the same NPN and PNP type as those of the current generator and has a known beta ($\beta$) vs. $V_{be}$ relationship. The $V_{be}$ parameter is a variable quantity due to variations in the fabrication process of the integrated circuit. The bipolar transistor is arranged in the output stage of the protective circuit and has the resistor R3 connected across its base and emitter electrodes so as to establish a quantity $V_{tsd}$ that tracks variations in the beta ($\beta$) parameter thereby cancelling the effects that the variable $V_{be}$ parameter contributes to the TSD temperature.

In one embodiment, a current generator for supplying a predetermined collector current $I_{c1}$ comprises two opposite pairs of bipolar transistors selected from one of the NPN and PNP types with the opposite pairs operating with different current densities and with one of the opposite pairs having its electrode connected to a resistor R2. A bipolar transistor of the same type as those of the current generator serves as a thermal sensor and is arranged within the protective circuit to provide a quantity $V_{tsd}$ having a response characteristic that may be expressed by the following relationship:

$$V_{tsd}=1/[(R1/(R3*VT*Ln(9)))-(((R2-2R1)/(R3*VT*Ln(9)))/(\beta-2))]$$

DESCRIPTION OF EXEMPLARY EMBODIMENTS

Figure 1:
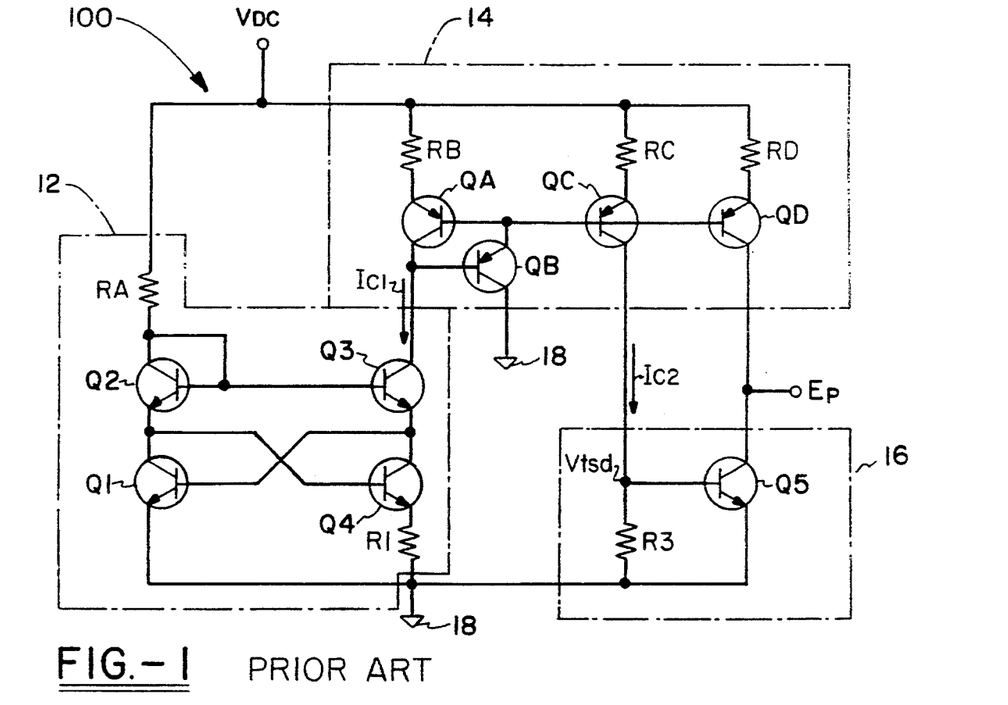
FIG. 1 illustrates an arrangement of a prior art thermal shutdown protective circuit.

Referring to the drawings, wherein like reference numbers designate like elements, there is shown in FIG. 1 a prior art thermal shutdown protective circuit 100 which may be first described in order to more fully appreciate the benefits of the thermal shutdown protective circuit of the present invention. In general, the prior art protective circuit 100 has an operation that does not adequately compensate for the variations in the $V_{be}$ parameter of its bipolar transistor serving as its thermal sensor. The variations in the $V_{be}$ parameter are created during the fabrication process of the bipolar transistor, and because of this uncertainty of the $V_{be}$ parameter, the accuracy for a protective circuit to provide a TSD temperature suffers. The operation of the prior art circuit 100, as well as the operation of the circuit 10 of the present invention, may be expressed mathematically, but such expressions may be more clearly understood by the use of the terms and subscripts given in Table 1 along with a general definition thereof.

TABLE 1

| TERM | GENERAL DEFINITION |
|---|---|
| TSD | temperature related to preventing a circuit from entering into a destructive mode of operation. |
| EGO | Band gap voltage of silicon extrapolated to 0° Kelvin. |
| VT | Thermal voltage at temperature T. |
| $VT_o$ | Thermal voltage at temperature $T_o$. |
| $T_o$ | Known temperature. |
| $V_{beo}$ | The value of $V_{be}$ of the thermal sensing transistor at $T_o$ and at a known collector current. |
| $I_{bo}$ | The value of $I_b$ of the sensing transistor at $T_o$ extrapolated back |

TABLE 1-continued

| TERM | GENERAL DEFINITION |
|---|---|
| | to $V_{be} = 0$. |

The prior art protective circuit 100 comprises a current generator 12 for supplying a predetermined collector current $I_{c1}$ that (neglecting base currents) flows through a resistor R1, a current mirror arrangement 14 for supplying a collector current $I_{c2}$ which has a mirror response to collector current $I_{c1}$ and which is of a value determined by the resistor R1, and a thermal sensor 16 arranged at the output stage of the protective circuit 100.

The current generator 12 comprises two opposite pairs Q1–Q3 and Q2–Q4 of bipolar transistors each having an output and selected from one of the NPN and PNP types which, in the embodiment shown in FIG. 1, is of the NPN type. The opposite pair Q2–Q4 operates at one third the current density of the pair Q1–Q3.

As shown in FIG. 1, resistor R1 is connected to the emitter electrode of the Q4 transistor. The transistors Q2 and Q3 have their base electrodes connected to each other and to one end of a resistor RA which has its other end connected to the $V_{dc}$ excitation having a typical value of +5 volts DC. The transistor Q1 has its base electrode connected to the emitter electrode of transistor Q3 and the collector of Q4, whereas the transistor Q4 has its base electrode connected to the emitter electrode of the Q2 transistor and the collector of Q1. The emitter electrode of the transistor Q1 is connected to the circuit common 18 which common is also connected to the other end of the resistor R1.

The current mirror arrangement 14 comprises bipolar transistors QA, QB, QC, and QD and resistors RB, RC, and RD. The bipolar transistors are selected to be of an opposite type from that of the current generator 12. More particularly, as shown in FIG. 1, the current generator 12 comprises NPN type transistors, therefore, the current mirror arrangement comprises PNP type transistors. The transistors QA, QC and QD have their base electrodes connected to each other and their respective emitter electrodes connected to the $V_{dc}$ excitation by way of resistors RB, RC and RD. The common base of transistors QA, QC and QD is connected to the emitter electrode of the QB transistor which has its base electrode connected to the collector of transistor QA and its collector electrode connected to the circuit common 18. The collector electrode of transistor QA is connected to the collector electrode of transistor Q3. The collector current $I_{c1}$ flows from the collector electrode of QA into the collector electrode of Q3 (neglecting base currents). The cooperative action between the NPN current generator 12 and the PNP current mirror arrangement 14 develops current mirror current $I_{c2}$ which has a mirror response of that of collector current $I_{c1}$.

The thermal sensor 16 comprises a transistor Q5 and a resistor R3 arranged across the base and emitter electrodes of transistor Q5. The bipolar transistor Q5 is of the same NPN or PNP type as that of the transistors of the current generator. The bipolar transistor Q5 has a known beta ($\beta$) vs. $V_{be}$ relationship. The magnitude of the mirror current $I_{c2}$, flowing in resistor R3, and the resistive value of R3 are cooperatively selected to establish a voltage $V_{tsd}$ across the base-emitter electrodes.

Along the lines discussed in the "Background" section, the thermal sensor 16 establishes a voltage $V_{tsd}$. The magnitude of this voltage $V_{tsd}$ is set so as to equal the $V_{be}$ parameter of the sensing device Q5 at a certain temperature. Below this temperature the sensing device Q5 is rendered non-conductive and above this temperature the sensing device is rendered conductive. This temperature is the previously discussed TSD temperature.

The operation of the prior art circuit 100 inherently possesses a response that includes a relationship between the $V_{be}$ and the beta ($\beta$) parameters of the bipolar transistor Q5. This interrelationship may be given by expression (1) below and as such represents that high beta ($\beta$) transistors have low $V_{be}$ parameters, while low beta ($\beta$) transistors have higher $V_{be}$ parameters:

Expression 1:

$$V_{be}\alpha - Ln[C * \beta]$$

In operation, the current generator 12 develops a collector current $I_{c1}$ which is mirrored by the current mirror arrangement and directed into the resistor R3. This current $I_{c2}$ sets up the voltage $V_{tsd}$ having a relationship that may be given by expression (2) as follows:

Expression 2:

$$V_{tsd} = \frac{R3}{R1} * \frac{kT}{q} * Ln(9)$$

where the quantity kT/q may be represented as the parameter VT having the general definition as given in Table 1 and which may be given by expression (3) as follows:

Expression 3:

$$V_{tsd} = \frac{R3}{R1} * VT * Ln(9)$$

With regard to expressions 1, 2 and 3, in particular expression 2, the reference voltage $V_{tsd}$ has a positive temperature coefficient due to the fact that the term T is in the numerator. Thus, as the temperature increases, $V_{tsd}$ becomes larger and eventually equals a large enough voltage to turn on or render conductive transistor Q5 which, in turn, produces the output signal $E_p$ which is used to shutdown power dissipating circuitry (not shown). The $V_{be}$ parameter necessary to turn on Q5 is also a function of temperature and has a relationship that may be approximated by the linear expression (4) as follows:

Expression 4:

$$i\ V_{be} = ((T/T_0)*(V_{beo}-EGO)) + EGO$$

where the terms $T_0$, $V_{beo}$ and EGO each has a general definition previously given in Table 1.

The thermal shutdown (TSD) temperature may be solved by equating the $V_{be}$ parameter (expression 4), of transistor Q5 to the $V_{tsd}$ parameter (expression 2) and yields the relationship that may be given in expression (5) as follows:

Expression 5:

$$TSD = T_o*EGO/[((R3/R1)*(VT_o)*(Ln(9))) - V_{beo} + EGO]$$

From expression (5) it can be seen that the TSD temperature is dependent on the $V_{beo}$ parameter ($V_{be}$ at $T_0$). It should be further noted that since R1 and R3 are in a ratio to each other, the ratio remains essentially the same even in the presence of process variations. The parameters other than $V_{beo}$ of expression (5) are constant. However, the $V_{beo}$ parameter of expression (5) has the most significant effect on the TSD temperature's dependence on process variations and such variations may be further described with reference to FIG. 2.

Figure 2:
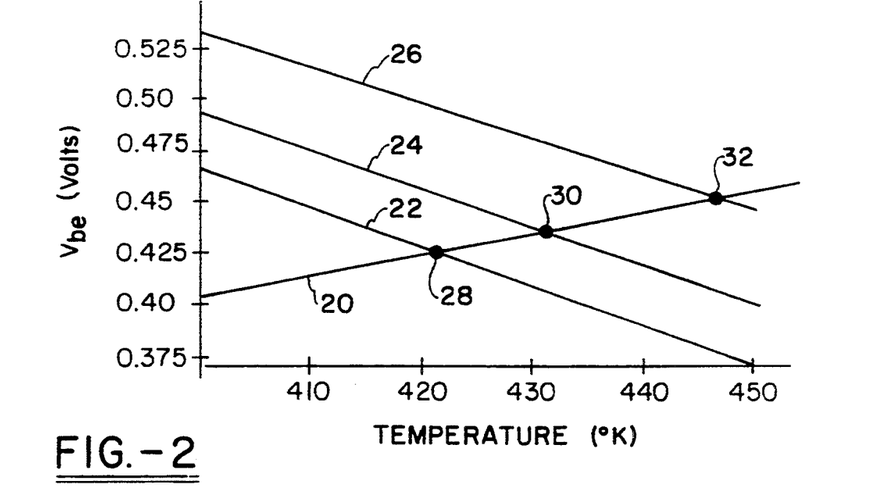
FIG. 2 shows plots that illustrate the variations of the TSD temperature due to the uncertainty of the $V_{be}$ parameter at a known temperature $T_o$.

FIG. 2 illustrates the TSD temperature variations due to fluctuations or uncertainties in the $V_{be}$ parameter. FIG. 2 has a Y axis giving the quantity $V_{be}$ (in volts) and an X axis giving the temperature at which a transistor, such as Q5, may be subjected (in K°). FIG. 2 further illustrates a positive sloping line 20 representing the $V_{tsd}$ voltage and three negative sloping lines 22, 24, 26 that respectively represent the $V_{be}$ parameter of the thermal sensing device for three different $V_{beo}$'s that can occur due to processing variations for the fabrication of Q5. The $V_{tsd}$ line 20 intersects the three different $V_{beo}$ lines 22, 24, 26 at locations 28, 30 and 32. Each intersection is representative of a different thermal shutdown temperature (TSD). These three different thermal shutdown temperatures (TSD) show the range of temperatures that may develop due to processing variations associated with the $V_{beo}$ parameter. From FIG. 2, it is seen that this range may extend from about 422° K. to about 446° K. The present invention does not suffer from these magnitudes of TSD temperature variations.

The present invention reduces the amount of variation in the TSD temperatures by exploiting the relationship between $V_{be}$ and the beta ($\beta$) parameters for bipolar transistors. The beta ($\beta$) parameter is defined by the ratio of the bipolar transistor's collector and base currents and has a relationship that may be given in expression (6) as follows:

Expression 6:

$$I_b \approx (qA)(D_E/L_E)(n_{EO})(\exp(qV_{be}/kT)) = I_{bo} * \exp(qV_{be}/kT)$$

where A, $D_E$, $L_E$, and $n_{Eo}$ are the area, diffusion coefficient, diffusion length and the carrier concentration for the bipolar transistor Q5 and the term T in the exponent of "e" represents temperature.

The relationship of expression (6) may be more simply represented by expression (7) given below:

Expression 7:

$$\beta = I_c/I_b = I_c/[((I_{bo})*(\exp(qV_{be}/kT)))]$$

Solving expression (7) for the $V_{be}$ parameter in the exponent of "e" yields a relationship that may be given by expression (8) given below:

Expression 8:

$$V_{be} = (-kT/q) * Ln[\beta*(I_{bo}/I_c)]$$

Figure 3:
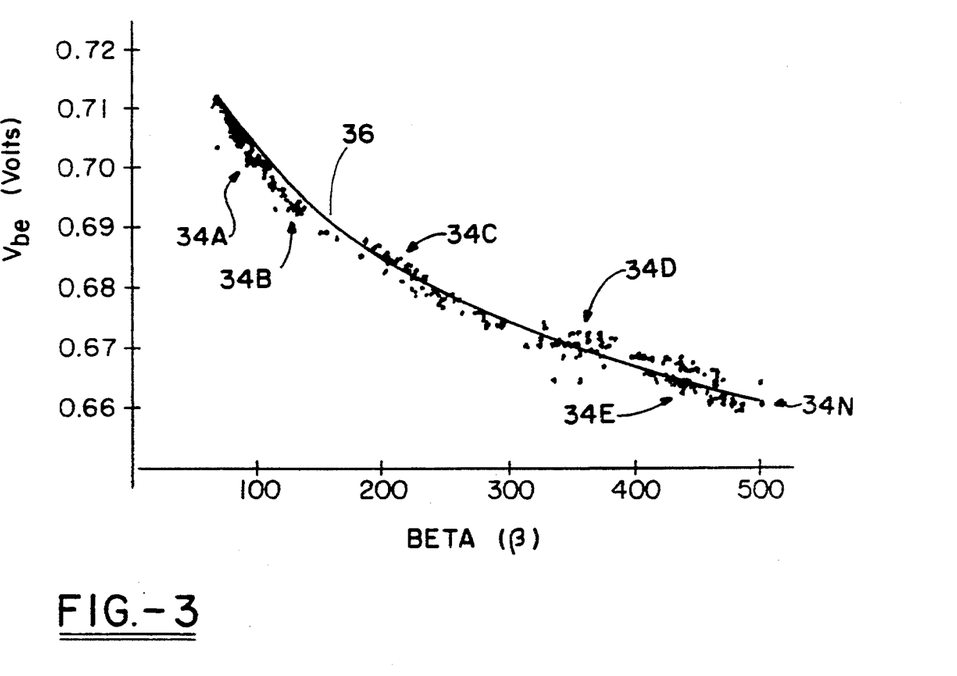
FIG. 3 illustrates the interrelationship between the $V_{be}$ and beta ($\beta$) parameters based upon data taken on both selected and regular lots for standard processes at room temperature for bipolar transistors.

The relationship of expression (8) may be further described with reference to FIG. 3. FIG. 3 has a Y axis given in $V_{be}$ (in volts) and an X axis given in the beta ($\beta$) parameter so as to illustrate the $V_{be}$ parameter vs. the beta ($\beta$) parameter for data taken on both selected lots and regular production lots for standard bipolar fabrication processes all conducted at room temperature. FIG. 3 shows the actual measured data as a plurality of groups of dots 34A, 34B, 34C, 34D, 34E, ... 35N. Expression (8) was fitted to this data 34A ... 34N and the resulting curve fit is shown as a plot 36. As seen in FIG. 3, the plot 36 representing expression (8) fits the measured data (34A ... 34N) well. However, it is impractical to create a circuit having a response characteristic that would duplicate or track plot 36 so that, from an obtainable point of view, an approximation of the expression (8) was attempted and realized and may be further described with reference to FIG. 4.

Figure 4:
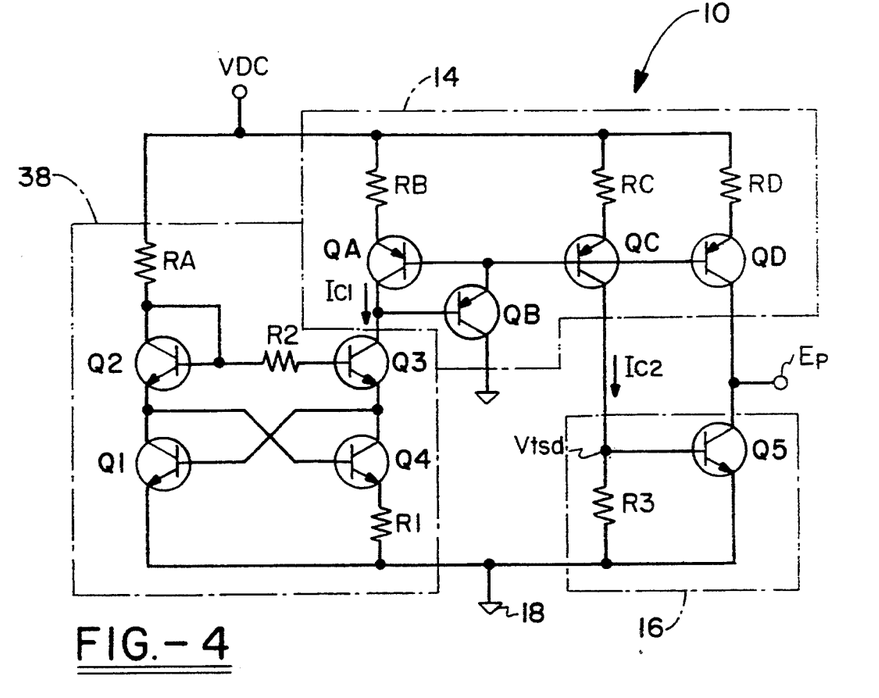
FIG. 4 is an arrangement of the thermal shutdown protective circuit of one embodiment of the present invention.

The protective circuit 10 of the present invention has a response characteristic that appropriates the relationship $V_{be}$ given in expression (8). The protective circuit 10 has many of the features of the circuit 100 of FIG. 1 and uses the same reference numbers and/or reference letters to indicate this commonality. However, the operation of a circuit arrangement of FIG. 4 is unlike FIG. 1 in that it uses the interrelationship between the $V_{be}$ and beta ($\beta$) parameter to substantially negate the effect of the thermal sensor's (Q5) $V_{be}$ process variations on the TSD temperature. More particularly, as shown in FIG. 4 with reference to current generator 38, a resistor R2 is added in series with the base of transistor Q3. This has the effect of changing the response of the circuit arrangement of FIG. 4 to one that will approximate the interrelationship between $V_{be}$ and beta ($\beta$) parameters as given in expression (8). The operation of the circuit of FIG. 4 may be represented by the expression (9) given below:

Expression 9:

$$V_{tsd} = 1/[(R1/(R3*VT*Ln(9))) - (((R2-2R1)/(R3*VT*Ln(9)))/(\beta-2))]$$

Expression (9) is identical to expression (3) except for the second term in the denominator. It is this second term that gives $V_{tsd}$ its beta ($\beta$) dependency. In order to arrive at the proper values of R1, R2 and R3 of the protective circuit 10, it is useful to curve fit expression (9) to the measured data for the $V_{be}$ and beta ($\beta$) as previously described with reference to FIG. 3. The curve fit may be of a form shown in expression (10) as follows:

Expression 10:

$$y = 1/[A - (B/(x-2))]$$

Figure 5:
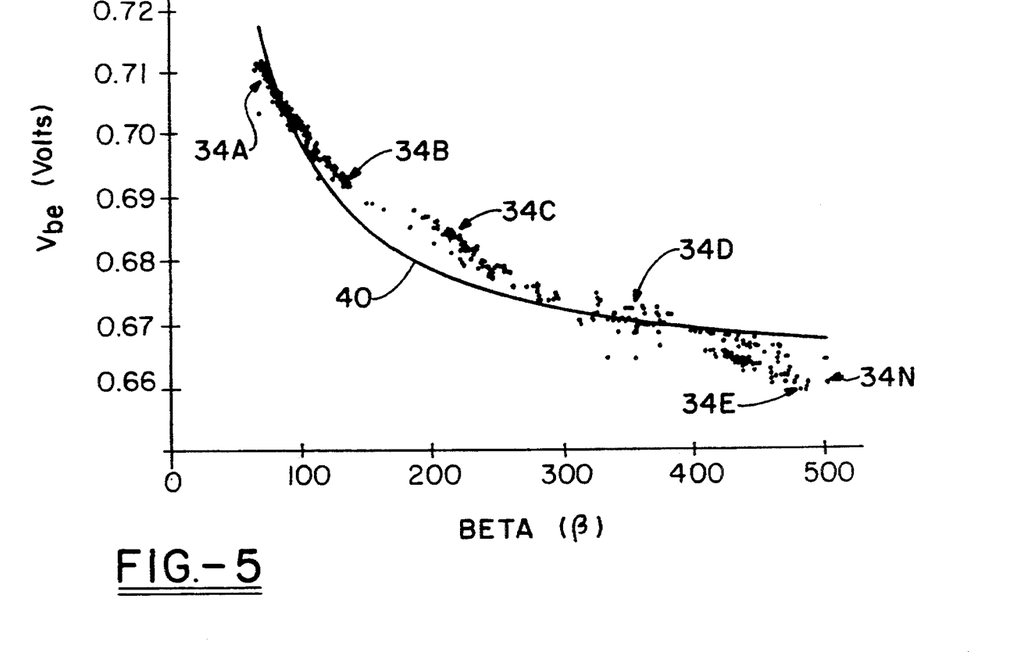
FIG. 5 illustrates the response characteristic of the protective circuit of FIG. 4 to the data shown in FIG. 3.

The use of the curve fitting of expression 10 yields a response of $V_{be}$ vs. beta ($\beta$) shown by a plot 40 in FIG. 5. FIG. 5 is similar to FIG. 3 and has the same X and Y axes thereof as well as the same reference nomenclature 34A ... 34N to show the measured data. A comparison between FIGS. 3 and 5 reveals that the plot 36 of FIG. 3 more closely matches the distribution of the dots 34A ... 34N than the plot 40 of FIG. 5; however, plot 40 is a relatively good match for the data distribution comprising 34A ... 34N and offers a significant reduction in the TSD temperature variations. The protective circuit 10 of FIG. 4 has a response which substantially tracks plot 40 in its obtainment and maintenance of the $V_{tsd}$ parameter of expression (9).

By using curve fitting techniques, once the values of A and B of expression (10) are known, then the values of R1, R2 and R3 of the protective circuit 10 can be determined. R1 is usually set to some desired value in order to set an approximate value for the collector current $I_{c1}$. Then R2 and R3 are determined by the use of expression (9). Typical values for R1, R2 and R3 are respectively about 470 ohms, about 9,000 ohms, and about 2,300 ohms. The enhanced performance provided by the protective circuit 10 may be further described with reference to FIGS. 6 and 7.

Figure 6:
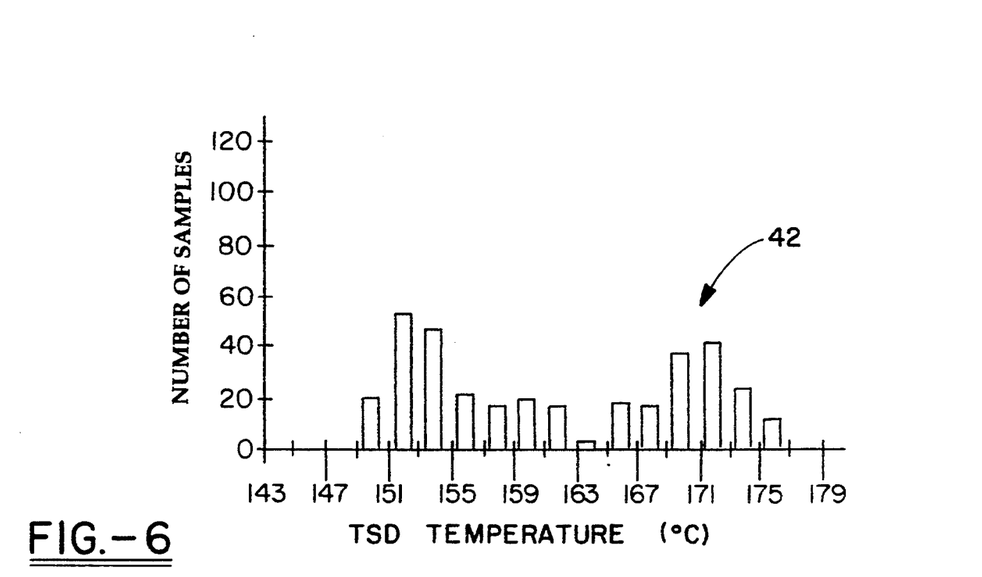
FIGS. 6 and 7 respectively show the calculated TSD temperatures for prior art protective circuits and the protective circuit of the present invention.
Figure 7:
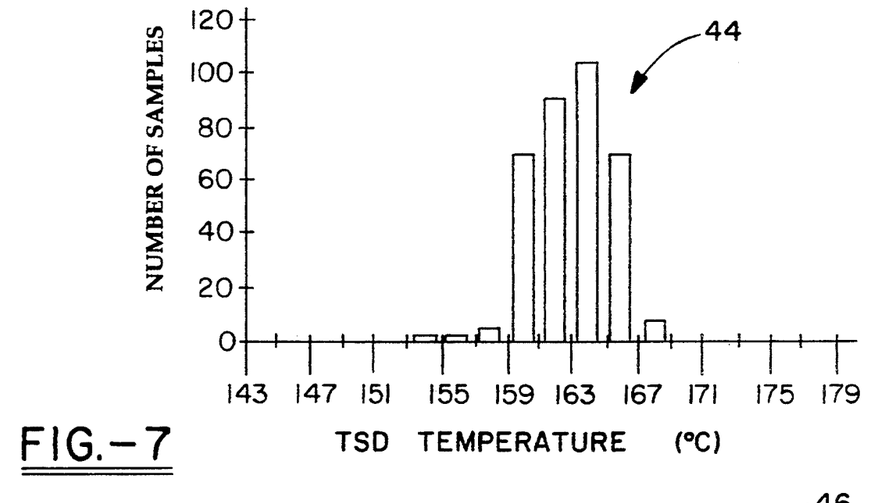

FIGS. 6 and 7 respectively show bar charts of the calculated TSD temperatures yielded by the prior art circuit of FIG. 1 and the circuit arrangement of the present invention of FIG. 4, wherein the operation of the circuit arrangement of FIG. 1 follows or tracks expression (2) and, conversely, the circuit arrangement of FIG. 4 follows or tracks the expression (9). The calculations shown in FIGS. 6 and 7 are based upon measured data for the $V_{be}$ and beta ($\beta$) parameter from a selected process lot involved with the fabrication of bipolar transistors that may find use as Q5 of both FIGS. 1 and 4.

As seen from FIGS. 6 and 7, the benefits of the present invention manifested in the chart of FIG. 7 is easily recognizable. More particularly, a comparison between FIGS. 6 and 7 reveals that prior art protective circuit 100 provides a TSD temperature ranging from about 150° C. to about 176° C., whereas the protective circuit 10 of the present invention provides a TSD temperature from about 159° C. to about 165° C.

Figure 8:
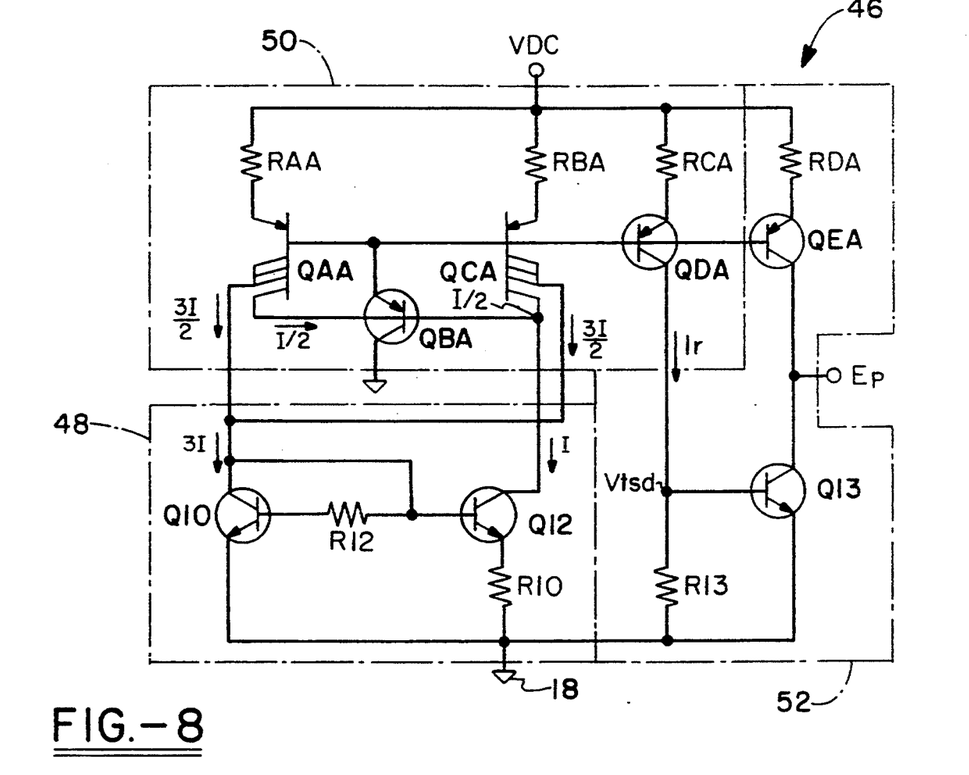
FIG. 8 shows an arrangement of a thermal shutdown protective circuit in accordance with a second embodiment of the present invention.

FIG. 8 illustrates a protective circuit 46 that operates in a manner similar to the protective circuit 10 of FIG. 4 but has a different arrangement of its elements. The protective circuit 46 comprises a current generator 48, a current mirror configuration 50 and a thermal sensor 52. The current generator comprises transistors Q10 and Q12 and resistors R10 and R12. The current mirror configuration comprises transistors QAA, QBA, QCA and QDA and resistors RAA, RBA and RCA. The transistors QAA and QCA are preferably of the PNP type having multiple collectors in which three of such collectors of each of QAA and QCA are shown grouped together. The thermal sensor 52 comprises the serial arrangement of transistors Q13 and QEA in which the emitter of transistor QEA is connected to one side of a resistor RDA having its other side connected to $V_{dc}$. Further, the thermal sensor 52 comprises a resistor R13 connected between the base and emitter of transistor Q13, with the node of the base identified as $V_{tsd}$.

The current mirror configuration 50 has many of the features of the current mirror arrangement 14 of FIG. 4 and, similarly, the current generator 48 has many of the features of the current generator 38 of FIG. 4. The current mirror configuration 50 has the emitter of each of the transistors QAA, QCA and QDA respectively connected to one end of resistors RAA, RBA and RCA which, in turn, have each of their other end connected to $V_{dc}$. The remaining transistor QBA of the current mirror configuration 50 has its emitter connected to the base of each of transistors QAA and QCA. The base of QCA is connected to the base of QDA which, in turn, has its base connected to the base of QEA. The base of QBA is connected to one of the collectors of each of the transistors QAA and QCA and with each such connection indicated by current flow I/2. The current flow related to the remaining three (3) collectors of each of the transistors QAA and QCA is indicated as 3I/2. As seen in FIG. 8 indicated by current flow I, both current flows I/2 combine and flow into Q12 and, similarly, as indicated by current flow 3I, both current flows 3I/2 combine and flow into Q10. Another current flow, that is Ir, flows through R13 and establishes the voltage $V_{tsd}$.

The voltage $V_{tsd}$ is set up across the base and emitter terminals or electrodes of Q13. This voltage has a positive temperature coefficient. The $V_{be}$ of transistor Q13 has a negative temperature coefficent. The value of R13 is selected such that at a predetermined temperature, transistor Q13 turns on to such an extent that it sinks or drains the collector current of QEA, thus, pulling the output thereof low. As discussed in the "Background" section, variations in the $V_{be}$ of transistor Q13 would normally limit the accuracy of the thermal shutdown temperature in typical circuits. However, because of the benefits of the present invention, in the circuit of FIG. 8, variations in $V_{be}$ are compensated for by exploiting the relationship between $V_{be}$ and beta ($\beta$). The circuit arrangement 46 of FIG. 8 establishes $V_{tsd}$ such that it has a known positive temperature coefficient and a magnitude that varies as the $V_{be}$ parameter of the process varies, in a manner as previously discussed with reference to FIG. 4.

The protective circuit 46 of FIG. 8 operates by establishing essentially a $\Delta V_{be}$ voltage across R10. This is accomplished by operating Q10 and Q12 at different current densities. More particularly, six collectors of the current mirror configuration 50, made up of transistors QAA, QBA, QCA and QDA, set up the collector current for Q10, while two collectors of the current mirror configuration 50 set up the collector current of Q12. This causes the current density of Q10 to be three times that of Q12. The various current flows that comprise these different current densities are shown in FIG. 8 with reference to current flows 3I/2, I/2, 3I and I.

As further shown in FIG. 8, R12 is added in the base of transistor Q10 such that Q10's base current sets up a voltage across R12. The voltage developed across R12 adds to the voltage across R10. The voltage across R10 comprises a $\Delta V_{be}$ term and a beta ($\beta$) dependent term due to the voltage developed across R12. It is this beta ($\beta$) dependent term that is used to compensate for the $V_{be}$ variations that occur over processing extremes of the integrated circuit that embodies the arrangement of FIG. 8.

The principle of the operation of FIG. 8, as well as FIG. 4, is particularly applicable to a monolithic integrated circuit and relies on the fact that the parameters of NPN transistors match each other on the integrated circuit. Thus, the thermal sensor 52 (also thermal sensor 16) and the devices in the current generator 48 (also current generator 38) will have matching characteristics, which provides for an accurate shutdown temperature (TSD) in spite of process variations in the $V_{be}$ parameter of the integrated circuit.

Again, with reference to FIG. 8, with RAA=RBA=RCA, the current Ir is equal to two (2) times the collector current of Q12. The current Ir flows through R13 setting up the voltage $V_{tsd}$.

The overall operation of FIG. 8 may be further generally disclosed by the below expressions:

Expression 11:

$$Ic_{Q10} = 3 \cdot Ic_{Q12}$$

Expression 12:

$$Ir = 2 \cdot Ic_{Q12}$$

Expression 13:

$$V_{R12} = (3 \cdot Ic_{Q12}/\beta) \cdot R12$$

Expression 14:

$$V_{tsd} = Ir \cdot R13$$

Expression 15:

$$V_{tsd} = 1/[(R10/(R13*VT*Ln(9))) - (((3R12)/(R13*VT*Ln(9)))/\beta)]$$

It should now be appreciated that the practice of the present invention provides multiple embodiments each of which reduces the variation of thermal shutdown temperature in thermal shutdown protective circuits. The practice of the present invention involves the use of the $V_{be}$ vs. beta ($\beta$) relationship for bipolar transistors and provides circuits which approximate this relationship thereby reducing the effect of the $V_{be}$ variations on the thermal shutdown (TSD) temperature.

It should also be appreciated that the practice of the present invention not only teaches the use of the relationship between the $V_{be}$ and beta ($\beta$) parameters so as to reduce the variations of the thermal shutdown temperatures, but also teaches the benefits of such a relationship that may find applications in other types of protective circuits requiring the need for an accurate and repeatable temperature detection parameter.

We claim:

1. A protective circuit for establishing a thermal shutdown temperature within a predetermined range and which circuit provides an output signal when said thermal shutdown temperature is exceeded, said protective circuit comprising:

(a) a current generator for supplying a predetermined collector current $I_{c1}$, said current generator comprising at least one pair of bipolar transistors having an output and selected from one of the NPN and PNP types with each of said pair operating with different current densities and each having emitter, base, and collector electrodes, said base electrodes of said at least one pair being interconnected by a first resistor, said collector current $I_{c1}$ flowing through a second resistor connected to the output of said at least one pair of bipolar transistors;

(b) a current mirror arrangement for supplying a collector current $I_{c2}$ which has a mirror response to that of said collector current $I_{c1}$ and is of a value determined by said second resistor;

(c) a thermal sensor comprising a bipolar transistor having base and emitter electrodes and a third resistor connected across said base and emitter electrodes of said bipolar transistor, said bipolar transistor being of the same NPN and PNP type as said generator and having a known beta ($\beta$) vs. $V_{be}$ relationship, said bipolar transistor being arranged in the output stage of said protective circuit to establish a quantity $V_{tsd}$ which determines the thermal shutdown temperature, said $V_{tsd}$ quantity tracking the response of the beta ($\beta$) parameter so as to cancel the effects that the variable $V_{be}$ parameter contributes to the thermal shutdown temperature.

2. A protective circuit for establishing a thermal shutdown temperature within a predetermined range and which circuit provides an output signal when said thermal shutdown temperature is exceeded, said protective circuit comprising;

(a) a current generator for supplying a predetermined collector current $I_{c1}$, said current generator comprising opposite first and second pairs of bipolar transistors each having an output and each selected from one of the NPN and PNP types with said first and second opposite pairs operating with different current densities and each having emitter, base and collector electrodes, one each of said opposite pairs having their base electrodes connected by a first resistor, said collector current $I_{c1}$ flowing through a second resistor connected to the output of one of said first and second opposite pairs of bipolar transistors having the lower current density;

(b) a current mirror arrangement for supplying a collector current $I_{c2}$ which has a mirror response to that of said collector current $I_{c1}$ and is of a value determined by said second resistor, said current mirror arrangement comprising bipolar transistors selected from the opposite NPN and PNP type as said current generator;

(c) a thermal sensor comprising a bipolar transistor having base and emitter electrodes and a third resistor connected across the base and emitter electrodes of said bipolar transistor, said bipolar transistor being of the same NPN and PNP type as said current generator and having a known beta ($\beta$) vs. $V_{be}$ relationship, said bipolar transistor being arranged in the output stage of said protective circuit to establish a quantity $V_{tsd}$ which determines the thermal shutdown temperature, said $V_{tsd}$ quantity tracking the response of the beta ($\beta$) parameter so as to cancel the effects that the variable $V_{be}$ parameter contributes to the thermal shutdown temperature.

3. A protective circuit for establishing a thermal shutdown temperature within a predetermined range and which circuit provides an output signal when said thermal shutdown temperature is exceeded, said protective circuit comprising;

(a) a current generator for supplying a predetermined collector current I, said current generator comprising opposite first and second bipolar transistors each having an output and each selected from one of the NPN and PNP types with said first and second opposite pairs operating with different current densities and each having emitter, base and collector electrodes, one each of said opposite pairs having their base electrodes connected by a resistor R12, said collector current I flowing through a resistor R10 connected to the output of one of said first and second bipolar transistors having the lower current density;

(b) a current mirror arrangement for supplying a collector current Ir which has a mirror response to that of said collector current I and is of a value determined by the resistor R10, said current mirror arrangement comprising bipolar transistors selected from the opposite NPN and PNP types as said current generator;

(c) a thermal sensor comprising a bipolar transistor having base and emitter electrodes and a resistor R13 connected across the base and emitter electrodes of said bipolar transistor, said bipolar transistor being of the same NPN and PNP type as said current generator and having a known beta ($\beta$) vs. $V_{be}$ relationship, said bipolar transistor being arranged in the output stage of said protective circuit to establish a quantity $V_{tsd}$ having a response that is expressed by the following relationship;

$$V_{tsd} = 1/[(R10/(R13*VT*Ln(9))) - (((3R12)/(R13*VT*Ln(9)))/\beta)]$$

* * * * *